UNITED STATES PATENT OFFICE.

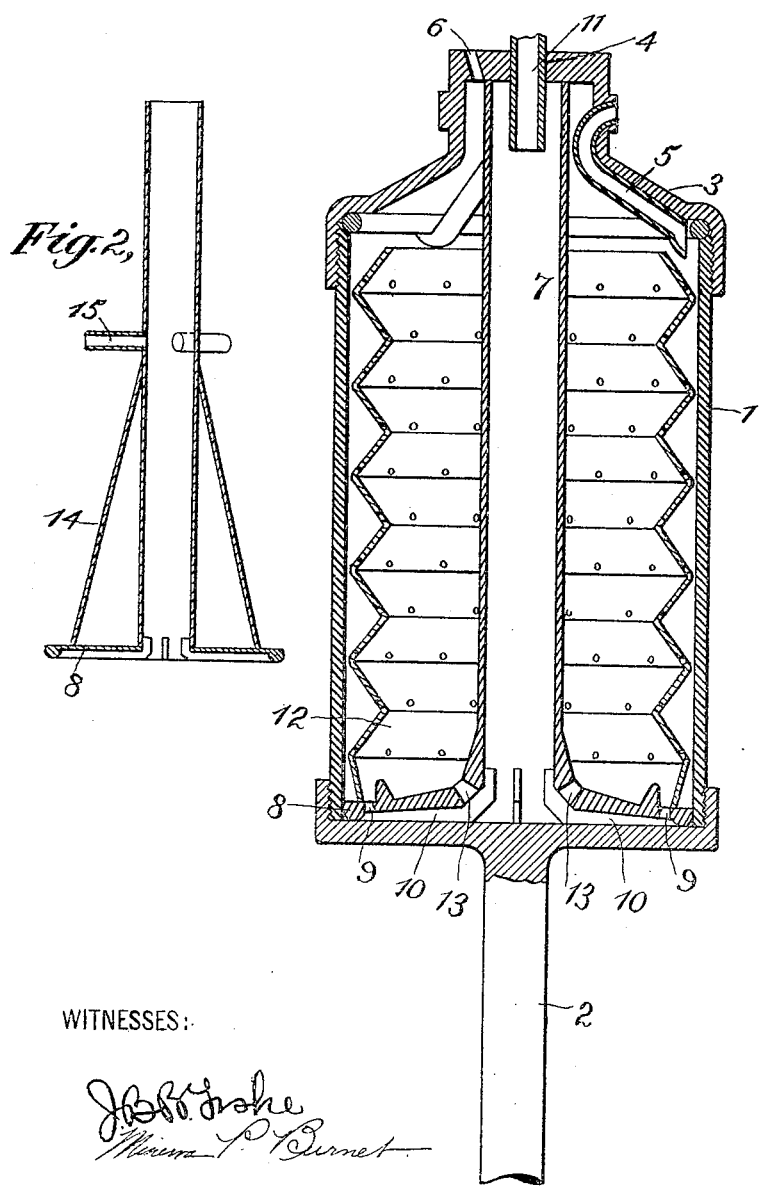

JAMES H. FLEMING, OF NEWARK, NEW JERSEY.

CENTRIFUGAL CREAM-SEPARATOR.

No. 801,068.      Specification of Letters Patent.      Patented Oct. 3, 1905.

Application filed June 25, 1904. Serial No. 214,094.

*To all whom it may concern:*

Be it known that I, JAMES H. FLEMING, a citizen of the United States, residing at Newark, in the county of Essex and State of New Jersey, have invented certain new and useful Improvements in Cream-Separators; and I do hereby declare the following to be a full, clear, and exact description of the invention, such as will enable others skilled in the art to which it appertains to make and use the same.

My invention relates to improvements in centrifugal cream-separators, and particularly to means for preventing "flushing" therein— *i. e.*, the rejection of the entering milk from the feed-tube due to the formation of foam. My invention is particularly intended to be applied to centrifugal cream-separators of the type comprising within the revolving bowl usual in such machines a central feed-tube discharging milk at its bottom only and arranged to impart rapid rotary motion to the milk so discharged and to deliver it into the main portion of said bowl at points near the walls thereof; but my invention is not limited to any particular construction of such type of cream-separator nor to its use in connection with that type of cream-separator only.

Heretofore trouble has been experienced in the operation of centrifugal cream-separators due to the collection in the feed-tube of foam which is sufficiently tenacious to exclude the entering milk from the feed-tube and cause it instead to pass off with the cream. This trouble is experienced particularly at certain times of the year and appears to be due to some ingredient then present in the milk. From its nature the trouble is a serious one, because it results in irregularity in the separation of the cream from the blue milk and in the production of cream of varying densities.

The objects of my invention are to disperse and destroy foam which may collect and tend to obstruct the flow of entering milk, to avoid the overflow of unseparated milk through either outlet of the machine, and to do this without complicating the construction of the machine without changing its manner of operation or reducing its efficiency and without material increase in cost.

I will now proceed to describe my invention with reference to the accompanying drawings, showing a conventional form of separator-bowl and contained parts of a cream-separator and two forms of feed-tubes which may be used therein and which embody my invention, and will then point out the novel features in claims.

In the said drawings, Figure 1 shows a central vertical section of such separator-bowl and contained parts, including one form of my improved feed-tube; and Fig. 2 is a similar section of an alternative form of my feed-tube.

In the said drawings, 1 indicates an ordinary separator-bowl mounted upon a vertical shaft 2 and adapted to be rotated thereby at high speed by any suitable means. (Not shown.)

3 indicates the ordinary cover or top for such bowl. The said top is provided with an opening 4, through which the stream of milk to be separated enters, and is also provided with the usual outlets 5 and 6 for skimmed milk and cream, respectively. The pans in which the skimmed milk and cream are received from these outlets are not shown, but may be of the usual type.

7 designates the central feed-tube, which extends from near the central admission-opening 4 downward or substantially downward to the bottom of the bowl 1 and is there provided with a flange 8, substantially covering the bottom of the bowl and provided near its periphery with openings 9. This flange is raised slightly from the bottom of the bowl by ribs 10, forming propeller-vanes which serve to impart to the entering milk the necessary rapid rotary motion. These vanes may project upward a short distance into the vertical portion of the feed-tube, as shown, in order that they may the better impart rotary motion to the milk. The milk is admitted to this central feed-tube in the ordinary manner through a feed-cup, of which only the spout 11 is shown in the drawings, said spout projecting downward a short distance into the feed-tube. The milk so delivered falls to the bottom of the feed-tube, where it is caught by the revolving vanes and, being spread out in a thin sheet between the flange 8 of the tube and the bottom of the cup of the bowl, passes up though the orifices 9 into the main portion of said bowl. By the time the milk has passed through these orifices 9 it is in very rapid rotation, and by centrifugal action the blue milk is separated from the cream, the latter, which is the lighter constituent, being forced to the center of the bowl, where it collects in a thin cylindrical band surrounding the vertical portion of the tube 7, the blue milk filling the remainder of the bowl. Both the cream and the blue or skimmed milk rise continuously within the bowl, the cream passing off through the outlet 6 and the skimmed milk through outlet 5. It is usual in separators of this sort to employ a collecting-cylinder 12, which serves to gather together the smaller particles of fat which are not in the first instance separated from the blue milk, but which are collected by said cylinder into masses possessing sufficient body to be forced by displacement back to the main body of separated cream surrounding the feed-tube. The particular collecting-cylinder shown is one well known; but I do not limit myself to the use of any particular type of collecting-cylinder or to the use of such cylinder at all.

So far as above described the construction of the cream-separator is an ordinary and well-known construction. In the operation of such separators it has been found that at certain times of the year and owing to some peculiar quality of the milk foam collects in the feed-tube in such quantity and having such tenacity that it prevents the flow to greater or less extent of entering milk downward through the feed-tube, rejecting said milk and causing it to pass off with the cream. This is of course a serious trouble. I have found that it may be avoided by providing openings or conduits—such as 13, Fig. 1—which terminate on the inside within the cream-wall which surrounds the tube 7 (during the operation of the machine any foam which may collect being of necessity within the cream-wall) and which preferably terminate on the outside beyond the normal cream-line—i. e., the exterior of the cream-wall. Said openings or conduits therefore serve to connect the space within the cream-wall with the space without such wall. The rate of feed of the milk through the central feed-tube is customarily such that no more milk is fed through than will be drawn outward centrifugally when the milk reaches the bottom of the tube. Consequently there is no accumulation of milk within the tube, and the openings or conduits 13 are out of the direct path of radial or centrifugal flow of the milk from the center of the bowl along the bottom thereof to the openings 9. I do not confine myself to any particular theory as to the action which these orifices have, the fact being that when present they do prevent the collection of foam to any material extent, and, as above stated, I believe it desirable, though not necessary, that these orifices shall terminate beyond the normal cream-line.

Theoretical considerations show that the cream-wall is not of uniform thickness, but that it is thickest at or near the top of the bowl, becoming progressively thinner from such point downward until it nearly or completely disappears near the bottom of the bowl. This is necessarily the case, because the fat globules as they emerge from the openings 9 move upward as well as inward. The cream-wall continues to receive accretions of fat globules from the space outside of said wall up to or nearly to the top of the bowl. While from the nature of things the exact location of the cream-line is not directly observable and its precise location will depend somewhat upon the design of the particular separator-bowl, it is clear that dotted lines—such as $x\ x$, Fig. 1—starting near the bottom of the bowl and near the side of the feed-tube and extending upward and outward represent approximately the location of the cream-line in the particular type of separator illustrated.

It is not necessary that the orifices 13 shall be located substantially at the point of juncture of tube 7 and flange 8. They may be located at any convenient point along the tube 7; but it is preferable to locate these openings as far down the tube as is consistent with the destruction of foam forming in such tube in order that whatever milk passes out through such openings—such, for example, as the milk contained in the foam—may be subjected to the full separating action of the machine.

In Fig. 2 I have shown an alternative form of feed-tube constructed in accordance with Patent No. 666,344, issued to me and comprising a downwardly-flaring cone 14, fitted to the tube and inclosing with said tube and flange 8 a dead-space. In such form of tube I prefer to provide the foam-preventing outlets by employing tubes 15 projecting from the feed-tube at suitable points and extending beyond the normal cream-line; but instead of providing the feed-tube with tubes 15 I may simply provide openings at the points where such tubes are shown. It is preferable, however, to employ the tubes 15, as if simple openings are provided any foam passing out therethrough encounters the cream-wall surrounding the feed-tube. The same tubes 15 are obviously applicable to a feed-tube such as shown in Fig. 1, which is not provided with the cone 14; but in such a tube it is ordinarily more convenient and less expensive to provide holes 13, as shown. This modification of my invention is claimed in a separate application for Letters Patent filed July 1, 1904, Serial No. 214,858.

It is obvious that my invention is susceptible of many variations and modifications and that the foam-preventing openings may be located at various points on the inlet-tube. Therefore I do not limit myself to the particular details of construction and arrangement herein illustrated and described.

What I claim is—

1. In a centrifugal separator, the combination with a rotatable receptacle, of a bottom-discharge central inlet-tube therefor provided with a foam-dispersing conduit the inner orifice of which is within the normal cream-line.

2. In a centrifugal separator, the combination with a rotatable receptacle, of a bottom-discharge central inlet-tube therefor provided with a foam-dispersing conduit the inner orifice of which is within the normal cream-line and which extends to the outer side of said tube.

3. In a centrifugal separator, the combination with a rotatable receptacle, of a bottom-discharge central inlet-tube therefor provided at its bottom with an outwardly-projecting flange having in it an opening outside the normal cream-line for the passage of liquid from between said flange and the bottom of the receptacle upward, said tube provided, within the normal cream-line, with foam-dispersing means.

4. In a centrifugal separator, the combination with a rotatable receptacle, of a bottom-discharge central inlet-tube therefor provided at its bottom with an outwardly-projecting flange having in it an opening outside the normal cream-line for the passage of liquid from between said flange and the bottom of the receptacle upward, said tube provided with a conduit connecting the space within said tube and the normal cream-line with the space outside of said tube.

5. In a centrifugal separator, the combination with a rotatable receptacle, of a bottom-discharge central inlet-tube therefor provided at its bottom with an outwardly-projecting flange having in it an opening outside the normal cream-line for the passage of liquid from between said flange and the bottom of the receptacle upward, said tube provided with a conduit connecting the space inside said tube with the space outside said tube and terminating at one end inside the cream-line and at the other end outside said line.

6. In a centrifugal separator, the combination with a rotatable receptacle, of a central inlet-tube therefor having an opening for discharging liquid into said receptacle, said tube provided, in addition to such opening, with foam-dispersing means located out of the line of centrifugal flow of the entering liquid.

7. In a centrifugal separator, the combination with a rotatable receptacle, of a central inlet-tube therefor having an opening for discharging liquid into said receptacle, said tube provided, in addition to such opening, with a foam-dispersing conduit the inner orifice of which is located out of the line of centrifugal flow of the liquid entering said receptacle through and from said tube, said conduit extending outward from such inner orifice.

8. In a centrifugal separator, the combination with a rotatable receptacle, of a bottom-discharge central inlet-tube therefor provided at its bottom with an outwardly-projecting flange having in it an opening outside the normal cream-line for the passage of liquid from between said flange and the bottom of the receptacle upward, said tube provided with foam-dispersing means located out of the line of centrifugal flow of the entering liquid.

9. In a centrifugal separator, the combination with a rotatable receptacle, of central inlet-tube therefor provided with an outwardly-projecting flange having in it an opening for the passage of liquid from beneath said flange upward, said tube provided with a conduit the inner orifice of which is located out of the line of centrifugal flow of the liquid entering said receptacle through and from said tube, said conduit connecting the space within said tube with the space surrounding said tube.

10. In a centrifugal separator, the combination with a rotatable receptacle, of a bottom-discharge central inlet-tube therefor provided at its bottom with an outwardly-projecting flange having in it an opening for the passage of liquid from between said flange and the bottom of the receptacle upward, said tube further provided with an opening located at the intersection of the tube proper and flange and connecting the space within said tube with the space surrounding it.

11. A feed-tube for centrifugal separators comprising a tube open at the bottom and adapted to discharge liquid through such opening into a rotatable separating-receptacle, said tube provided with a foam-dispersing conduit extending from a point within the normal cream-line outward.

12. A feed-tube for centrifugal separators comprising a tube open at the bottom and having at the bottom a laterally-projecting flange, said tube adapted to discharge liquid through such open bottom into a rotatable separating-receptacle, said tube provided with a foam-dispersing conduit extending from a point within the normal cream-line outward.

13. A feed-tube for centrifugal separators comprising a tube open at the bottom and having at the bottom a laterally-projecting flange, said tube further provided at the point of intersection of the tube proper and said flange with a conduit connecting the space within said tube with the space surrounding the tube.

14. A feed-tube for centrifugal separators comprising a tube adapted to be received within a rotatable separating-receptacle, said tube open at the bottom and provided at its bottom with a projecting flange which, when the tube is in place, is above the bottom of said receptacle, said tube further provided with a conduit the inner orifice of which is located out of the line of centrifugal flow of liquid between said flange and the bottom of the receptacle, which conduit connects the space within said tube with the space surrounding the tube.

15. In a centrifugal separator, the combination with a rotatable receptacle, of a bottom-discharge central inlet-tube therefor provided with a foam-dispersing conduit extending from the portion of the wall of said tube nearest the center to the outside of said tube.

16. A feed-tube for centrifugal separators, comprising a tube open at the bottom and adapted to discharge liquid through such open bottom into a rotatable separating-receptacle, said tube provided with a foam-dispersing conduit extending from the portion of the wall of said tube nearest the center to the outside of said tube.

17. In a centrifugal separator, the combination with a rotatable receptacle, of a bottom-discharge central inlet-tube therefor provided at a point above its bottom with a foam-dispersing conduit the inner orifice of which is within the normal cream-line.

18. In a centrifugal separator, the combination with a rotatable receptacle, of a bottom-discharge central inlet-tube therefor provided at a point above its bottom with a foam-dispersing conduit the inner orifice of which is within the normal cream-line and which extends to the outer side of said tube.

19. A feed-tube for centrifugal separators comprising a tube open at the bottom and adapted to discharge liquid through such opening into a rotatable separating-receptacle, said tube provided at a point above its bottom with a foam-dispersing conduit the inner orifice of which is within the normal cream-line.

In testimony whereof I affix my signature in the presence of two witnesses.

JAS. H. FLEMING.

Witnesses:
  J. B. B. FISKE,
  MINERVA P. BURNET.